United States Patent
Levit-Gurevich

(10) Patent No.: US 10,949,330 B2
(45) Date of Patent: Mar. 16, 2021

(54) BINARY INSTRUMENTATION TO TRACE GRAPHICS PROCESSOR CODE

(71) Applicant: Intel Corporation, Santa Clara, CA (US)

(72) Inventor: Konstantin Levit-Gurevich, Kiryat Byalik (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/296,357

(22) Filed: Mar. 8, 2019

(65) Prior Publication Data

US 2019/0205243 A1 Jul. 4, 2019

(51) Int. Cl.
| G06F 11/36 | (2006.01) |
| G06T 1/20 | (2006.01) |
| G06F 8/41 | (2018.01) |
| G06F 9/52 | (2006.01) |

(52) U.S. Cl.
CPC .......... *G06F 11/3636* (2013.01); *G06F 8/427* (2013.01); *G06F 9/52* (2013.01); *G06T 1/20* (2013.01)

(58) Field of Classification Search
CPC .. G06F 11/3636; G06F 11/3644; G06F 8/443; G06F 8/427; G06F 9/52; G06T 1/20
See application file for complete search history.

(56) References Cited

U.S. PATENT DOCUMENTS

| 5,887,167 A * | 3/1999 | Sutton ................. | G06F 9/52 718/106 |
| 7,454,666 B1 * | 11/2008 | Jordan .............. | G06F 11/3636 712/227 |
| 8,490,061 B2 * | 7/2013 | Chung ................ | G06F 8/443 717/128 |
| 8,810,586 B2 * | 8/2014 | Sudo ................. | G06F 3/14 345/502 |
| 10,504,492 B2 * | 12/2019 | Hong ................. | G06F 9/00 |
| 2004/0163077 A1 * | 8/2004 | Dimpsey ............ | G06F 11/3466 717/130 |
| 2013/0141442 A1 * | 6/2013 | Brothers ............ | G06T 1/20 345/502 |

(Continued)

OTHER PUBLICATIONS

Kambadur et al. "Fast Computational GPU Design with GT-Pin", 2015 IEEE International Symposium on Workload Characterization, pp. 76-86 (Year: 2015).*

(Continued)

*Primary Examiner* — Marina Lee
(74) *Attorney, Agent, or Firm* — Jordan IP Law, LLC

(57) ABSTRACT

An embodiment of a semiconductor package apparatus may include technology to determine a size for a trace buffer based on instrumented code to be executed on a graphics processor, initialize the trace buffer in a shared memory based on the determined size, provide the instrumented code to the graphics processor to be executed, collect data in the trace buffer from the executed instrumented code, analyze the data collected in the trace buffer on a processor, and generate a trace of the instrumented code on the processor based on the analyzed data. Other embodiments are disclosed and claimed.

25 Claims, 13 Drawing Sheets

(56) References Cited

U.S. PATENT DOCUMENTS

| | | | |
|---|---|---|---|
| 2014/0098113 A1* | 4/2014 | Sabony | G06T 1/20 |
| | | | 345/505 |
| 2015/0135313 A1* | 5/2015 | Wesie | G06F 8/53 |
| | | | 726/22 |
| 2015/0355996 A1* | 12/2015 | Smith | G06F 9/461 |
| | | | 717/128 |
| 2016/0358304 A1* | 12/2016 | Wang | G06T 1/60 |
| 2019/0034316 A1 | 1/2019 | Levit-Gurevich et al. | |
| 2019/0042223 A1 | 2/2019 | Gorshkov et al. | |
| 2019/0043158 A1* | 2/2019 | Levit-Gurevich | G06F 9/5083 |
| 2019/0043457 A1* | 2/2019 | Hong | G09G 5/363 |
| 2019/0139183 A1* | 5/2019 | Goldman | G06T 15/00 |
| 2019/0205243 A1* | 7/2019 | Levit-Gurevich | G06T 1/20 |
| 2019/0213706 A1* | 7/2019 | Goldman | G06F 9/5055 |
| 2020/0012585 A1* | 1/2020 | Levit-Gurevich | G06F 9/52 |

OTHER PUBLICATIONS

Ady Ta, "Intel Software Delveopment Emulator", Intel Software Developer Zone, Oct. 23, 2017, 39 pages.

Osnat Levi, "Pin—A Dynamic Binary Instrumentation Tool", Intel Software Developer Zone, Jun. 25, 2018, 6 pages.

Konstantin Levit-Gurevich et al., U.S. Appl. No. 15/718,435, entitled "Techniques for Performance Analysis of Processor Instruction Execution", filed Sep. 28, 2017, 38 pages.

* cited by examiner

BINARY INSTRUMENTATION TO TRACE GRAPHICS PROCESSOR CODE

TECHNICAL FIELD

Embodiments generally relate to software systems. More particularly, embodiments relate to binary instrumentation to trace graphics processor code.

BACKGROUND

Binary instrumentation may refer to software technology for monitoring performance, diagnosing errors, and writing trace information for code. INTEL PIN is a dynamic binary instrumentation framework for the IA-32, x86-64 and MIC instruction-set architectures that enables the creation of dynamic program analysis tools. Some tools built with PIN include INTEL VTUNE AMPLIFIER XE, INTEL INSPECTOR XE, INTEL ADVISOR XE and INTEL SOFTWARE DEVELOPMENT EMULATOR (SDE).

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
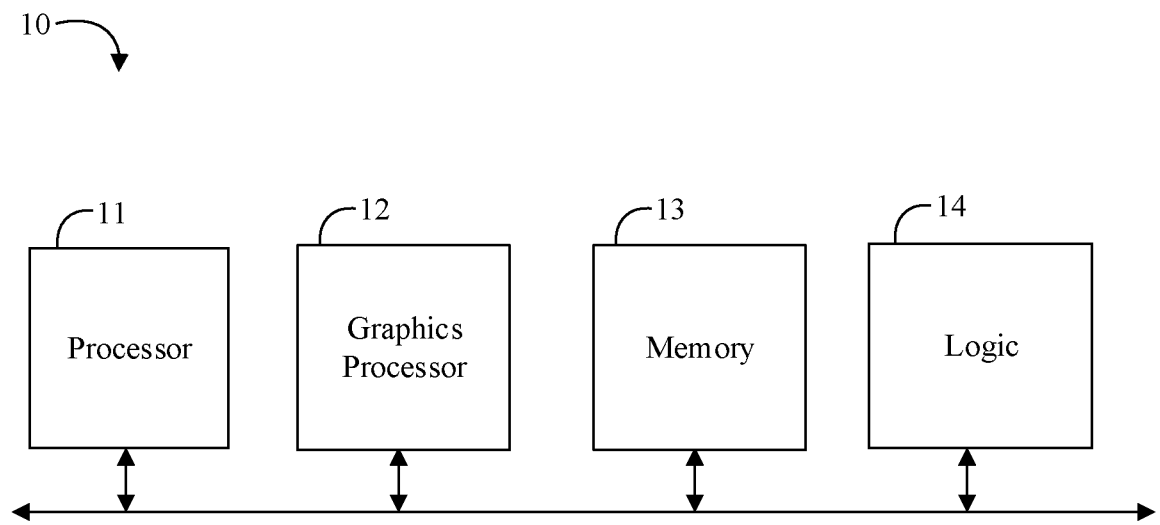
FIG. 1 is a block diagram of an example of an electronic processing system according to an embodiment.

Turning now to FIG. 1, an embodiment of an electronic processing system 10 may include a processor 11, a graphics processor 12, memory 13 communicatively coupled to the processor 11 and the graphics processor 12, and logic 14 communicatively coupled to the processor 11 and the graphics processor 12 to determine a size for a trace buffer based on instrumented code to be executed on the graphics processor 12, initialize the trace buffer in the memory 13 based on the determined size, provide the instrumented code to the graphics processor 12 to be executed, collect data in the trace buffer from the executed instrumented code, analyze the data collected in the trace buffer on the processor 11, and generate a trace of the instrumented code on the processor 11 based on the analyzed data. In some embodiments, the logic 14 may be configured to provide the instrumented code with a pointer to the trace buffer. For example, the logic 14 may also be configured to atomically access the trace buffer to reserve a portion of the trace buffer for data from a thread of the executed instrumented code. In some embodiments, the logic 14 may be further configured to determine static trace information prior to execution of the instrumented code. For example, the logic 14 may also be configured to parse the dynamically collected data on the processor 11, separate dynamic trace information on the processor 11 based on thread information from the parsed data, and combine the dynamic trace information with the static trace information to generate the trace of the instrumented code on the processor 11. In any of the embodiments herein, the graphics processor 12 may comprise two or more parallel execution units (EUs, e.g., tens or hundreds of EUs). In some embodiments, the memory 13 and/or the logic 14 may be located in, or co-located with, various components, including the processor 11 and/or the graphics processor 12 (e.g., on a same die).

Embodiments of each of the above processor 11, graphics processor 12, memory 13, logic 14, and other system components may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof. Embodiments of the processor 11 may include a general purpose processor, a special purpose processor, a central processor unit (CPU), a controller, a micro-controller, etc. Embodiments of the graphics processor 12 may include a parallel processor unit (PPU), a graphics processor unit (GPU), etc.

Alternatively, or additionally, all or portions of these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C# or the like and conventional procedural programming languages, such as the "C" programming language or similar programming languages. For example, the memory 13, persistent storage media, or other system memory may store a set of instructions which when executed by the processor 11 and/or the graphics processor 12 cause the system 10 to implement one or more components, features, or aspects of the system 10 (e.g., the logic 14, determining the size of the trace buffer, initializing the trace buffer, providing the instrumented code to the graphics processor, collecting data in the trace buffer from the executed instrumented code, analyzing the data collected in the trace buffer, generating the trace, etc.).

Figure 2:
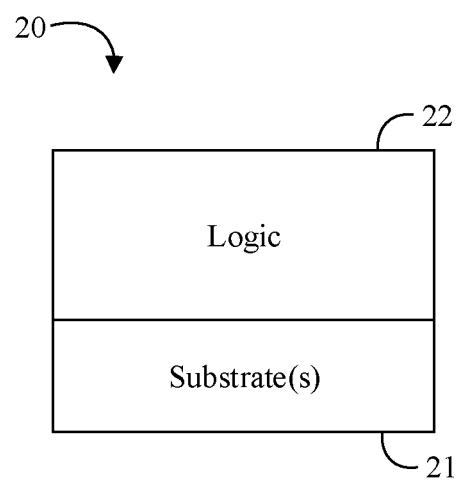
FIG. 2 is a block diagram of an example of a semiconductor package apparatus according to an embodiment.

Turning now to FIG. 2, an embodiment of a semiconductor package apparatus 20 for use with a graphics processor may include one or more substrates 21, and logic 22 coupled to the one or more substrates 21, wherein the logic 22 is at least partly implemented in one or more of configurable logic and fixed-functionality hardware logic. The logic 22 coupled to the one or more substrates 21 may be configured to determine a size for a trace buffer based on instrumented code to be executed on a graphics processor, initialize the trace buffer in a shared memory based on the determined size, provide the instrumented code to the graphics processor to be executed, collect data in the trace buffer from the executed instrumented code, analyze the data collected in the trace buffer on a processor, and generate a trace of the instrumented code on the processor based on the analyzed data. In some embodiments, the logic 22 may be configured to provide the instrumented code with a pointer to the trace buffer. For example, the logic 22 may also be configured to atomically access the trace buffer to reserve a portion of the trace buffer for data from a thread of the executed instrumented code. In some embodiments, the logic 22 may be further configured to determine static trace information prior to execution of the instrumented code. For example, the logic 22 may also be configured to parse the dynamically collected data on the processor, separate dynamic trace information on the processor based on thread information from the parsed data, and combine the dynamic trace information with the static trace information to generate the trace of the instrumented code on the processor. In any of the embodiments herein, the graphics processor may comprise two or more parallel EUs. In some embodiments, the logic 22 coupled to the one or more substrates 21 may include transistor channel regions that are positioned within the one or more substrates 21.

Embodiments of logic 22, and other components of the apparatus 20, may be implemented in hardware, software, or any combination thereof including at least a partial implementation in hardware. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine-or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

The apparatus 20 may implement one or more aspects of the method 25 (FIGS. 3A to 3C), or any of the embodiments discussed herein. In some embodiments, the illustrated apparatus 20 may include the one or more substrates 21 (e.g., silicon, sapphire, gallium arsenide) and the logic 22 (e.g., transistor array and other integrated circuit/IC components) coupled to the substrate(s) 21. The logic 22 may be implemented at least partly in configurable logic or fixed-functionality logic hardware. In one example, the logic 22 may include transistor channel regions that are positioned (e.g., embedded) within the substrate(s) 21. Thus, the interface between the logic 22 and the substrate(s) 21 may not be an abrupt junction. The logic 22 may also be considered to include an epitaxial layer that is grown on an initial wafer of the substrate(s) 21.

Figure 3A:
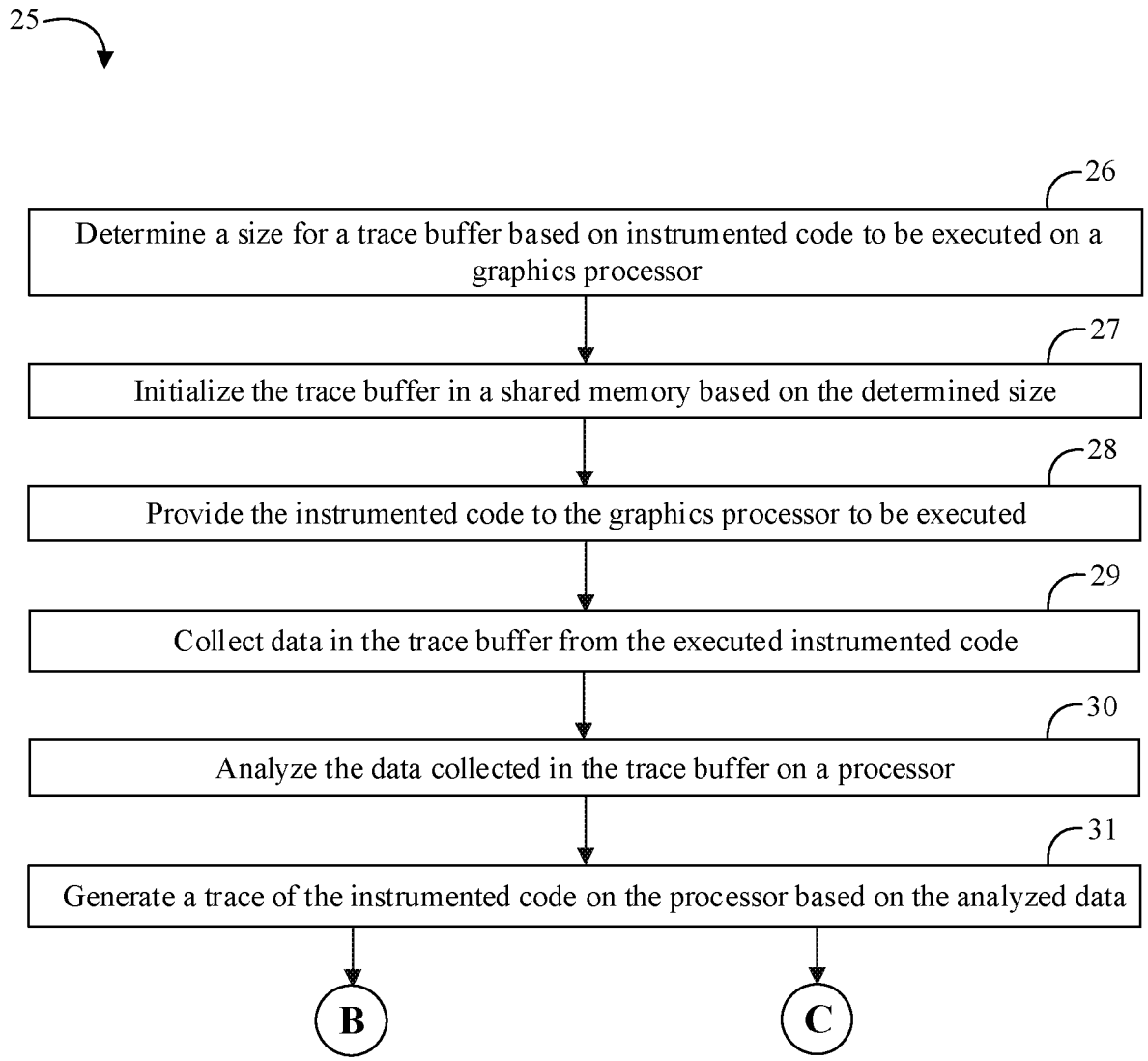
FIGS. 3A to 3C are flowcharts of an example of a method of tracing code according to an embodiment.
Figure 3B:
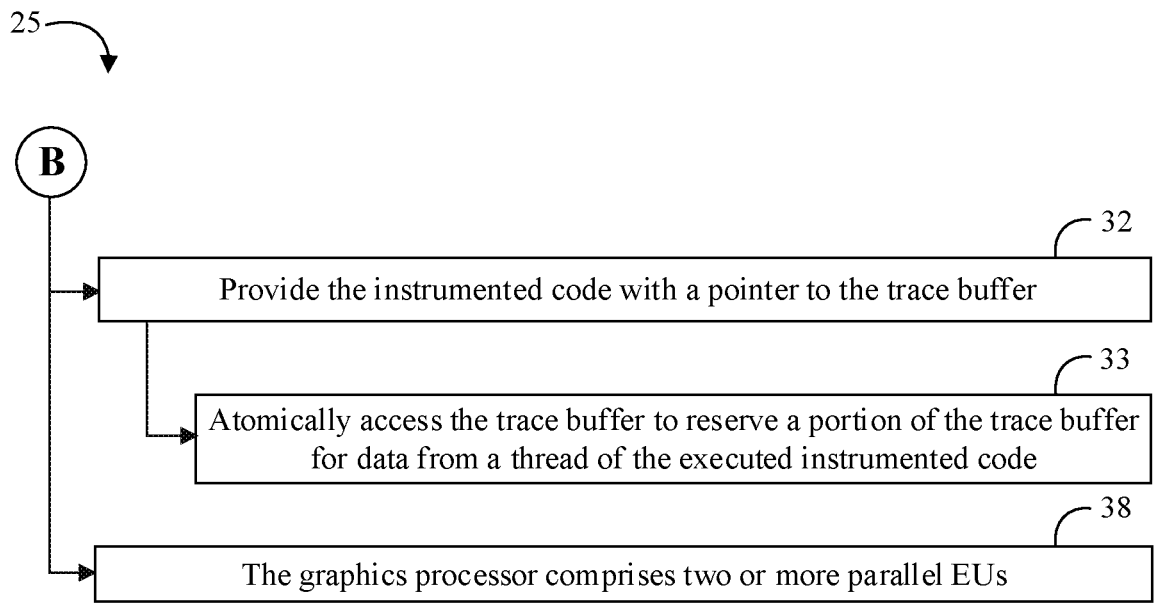
Figure 3C:
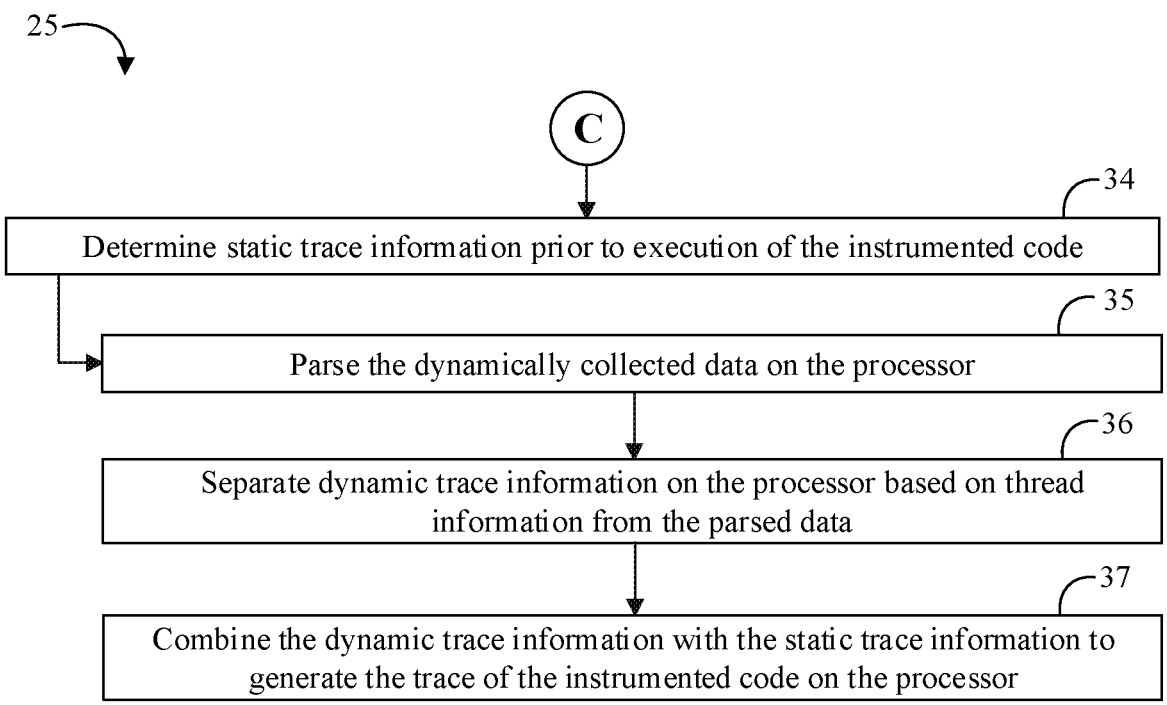

Turning now to FIGS. 3A to 3C, an embodiment of a method 25 of tracing code may include determining a size for a trace buffer based on instrumented code to be executed on a graphics processor at block 26, initializing the trace buffer in a shared memory based on the determined size at block 27, providing the instrumented code to the graphics processor to be executed at block 28, collecting data in the trace buffer from the executed instrumented code at block 29, analyzing the data collected in the trace buffer on a processor at block 30, and generating a trace of the instrumented code on the processor based on the analyzed data at block 31. Some embodiments of the method 25 may include providing the instrumented code with a pointer to the trace buffer at block 32. For example, the method 25 may also include atomically accessing the trace buffer to reserve a portion of the trace buffer for data from a thread of the executed instrumented code at block 33. Some embodiments of the method 25 may further include determining static trace information prior to execution of the instrumented code at block 34. For example, the method 25 may also include parsing the dynamically collected data on the processor at block 35, separating dynamic trace information on the processor based on thread information from the parsed data at block 36, and combining the dynamic trace information with the static trace information to generate the trace of the instrumented code on the processor at block 37. In any of the embodiments herein, the graphics processor comprises two or more parallel EUs at block 38.

Embodiments of the method 25 may be implemented in a system, apparatus, computer, device, etc., for example, such as those described herein. More particularly, hardware implementations of the method 25 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 25 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

For example, the method 25 may be implemented on a computer readable medium as described in connection with Examples 20 to 25 below. Embodiments or portions of the method 25 may be implemented in firmware, applications (e.g., through an application programming interface (API)), or driver software running on an operating system (OS). Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Advantageously, some embodiments may provide efficient technology for tracing GPU code using binary instrumentation. Dynamic profiling of binary code is very useful in the fields of performance analysis and tuning because profiling data is generated live as a program is executed on a real system. To achieve such dynamic profiling, either source code or binary code (e.g., source code is compiled to produce executable binary code) needs to be modified before or during execution. From the perspective of a user, binary modification is much more convenient because profiling can happen in the binary code itself, rather than the user having to find the source code, compile, etc. For example, binary instrumentation has been very effective in the fields of performance analysis and tuning, especially for CPUs (e.g., performance analysis tools like INTEL VTUNE, INTEL GRAPHICS PERFORMANCE ANALYZER (GPA)) due to its convenience and real profiling data from an actual system.

Recently, binary instrumentation technology has made it possible to extend the profiling capabilities to the binary code running on GPU devices. Such profiling information may include the latency of specific instructions or functions, dynamic instruction counters, etc. For other performance studies and analysis, however, there is a need for gathering dynamic traces, such as control-flow traces or memory accesses traces, where the traces can be used in the following manner(s): 1) As an input to architecture and performance simulators as well as used in replaying the execution natively; 2) Instruction (or control-flow) trace can be used for nested binary loops detection and trip count calculation to improve compiler quality; and/or 3) Memory (address) traces can be used by performance analyzers for detection of memory patterns and providing suggestions for memory access changes in order to gain performance.

Such traces can be readily generated for workloads running on a CPU (with PIN or SDE tools, for example). But for a GPU such a task is not efficient with conventional tools because code execution happens across multiple EUs simultaneously (e.g., tens or hundreds of EUs). Some embodiments may advantageously provide technology to generate a dynamic trace of the binary code running on GPU EUs via binary instrumentation. Some embodiments may provide a corner-case free technique allowing quick trace generation with a minimal overhead. Some embodiments may involve three phases: 1) Pre-processing phase: detecting the required size for the memory buffer to generate the trace; 2) Processing phase: efficient data generation from GPU with minimal information required; and 3) Postprocessing phase: analyzing the generated data and producing the final trace. Examples of each of these phases are described in more detail below.

Binary code running on a GPU device may sometimes be referred to as kernel and/or shader code. Embodiments may provide technology to manage the tracing buffer, which is filled up on the GPU device by hundreds of kernel instances running simultaneously on different hardware threads of the extremely parallel machine and accessing the tracing buffer concurrently. In some embodiments, the collected data is then post-processed on CPU device. Some embodiments may include features related to access to a memory buffer, atomic (or locked) accesses to memory, critical sections, and hardware (HW) thread identifiers (IDs), which may be present in most multi-threaded architectures (although different nomenclature may be used). Although some examples herein may be based on particular instruction sets or nomenclature, those skilled in the art will appreciate that the particular form or mnemonic of the instruction is not critical to any of the embodiments. Any instruction which accesses memory in any architecture provides the access address(es) (or "address payload") which can be obtained from its appropriate operands, which can be traced.

In general, embodiments advantageously provide as little overhead as possible on the GPU side, and shift such overhead to the CPU. Some embodiments may advantageously be applied to a variety of types of trace generation (e.g., relatively completeness; no corner cases) with good performance (e.g., effective on real world applications regardless of API (e.g., DX, OpenCL, etc.)). Some embodiments may provide an efficient and easily managed trace buffer layout, suitable for simple instrumentation.

Advantageously, little or minimal information is saved on the GPU side, and all the rest is done on the CPU side with no runtime CPU-GPU synchronization needed. The trace buffer size is pre-defined and cannot be overflowed, so no waiting time is needed for GPU synchronization. For example, some embodiments may first detect the size of the buffer to be allocated for the desired trace to avoid overflow by using pre-processing work, and thus eliminate the need for synchronization between the CPU and the GPU. The trace buffer is managed in a very simple way and minimal information is saved on the GPU side (all the rest is done on the CPU side). Thus, only a light-weight instrumentation is required to maintain the tracing process. Moreover, as being light-weight, some embodiments instrument all basic blocks of interest (e.g., including control-flow blocks) and thus avoid corner cases, and the reconstruction of the trace on the CPU side during the post-processing phase is simple.

Figure 4:
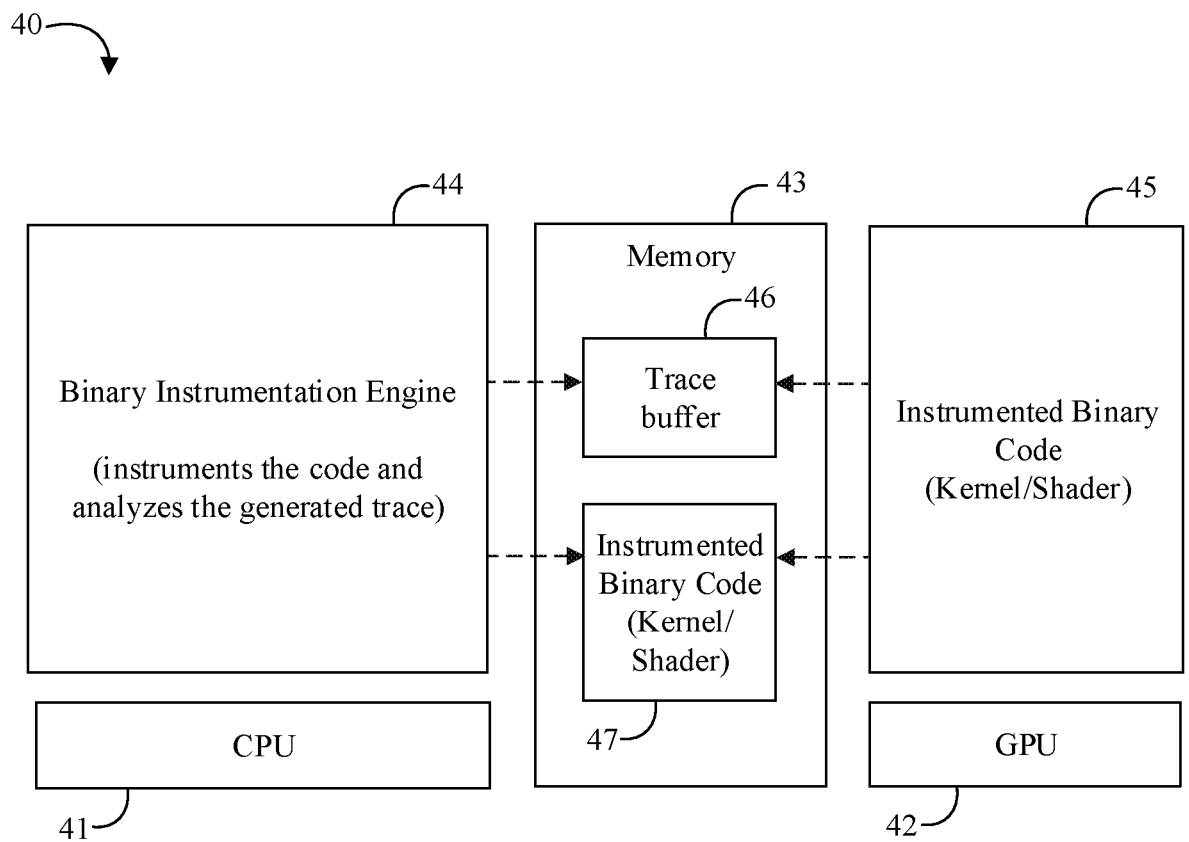
FIG. 4 is a block diagram of another example of an electronic processing system apparatus according to an embodiment.

Turning now to FIG. 4, an embodiment of an electronic processing system 40 may include a CPU 41, a GPU 42, and a memory 43 shared between the CPU 41 and the GPU 42. A binary instrumentation engine 44 may run on the CPU 41 to instrument the code and analyze the generated trace. The instrumented binary code 45 (e.g., kernel/shader/etc.) may run on the GPU 42. A portion of the memory 43 may be allocated to a trace buffer 46. Instrumented binary code 47 may also be stored on the memory 43 (e.g., placed there by the engine 44 to be executed by the GPU 42).

FIG. 4 also shows a high level flow of how the CPU and GPU sides communicate. The binary instrumentation engine 44 runs on the CPU side and is responsible for instrumentation of the original kernel/shader binary code, allocation and initialization of the memory buffers, runtime management and postprocessing of the results. Details of how the engine 44 communicates with a driver, instruments code and performs runtime management is omitted to avoid obscuring the description with details that are well within the scope of those skilled in the art. An instrumented kernel/shader 47 is sent by the driver to the GPU 42 and the instrumented kernel 45 runs on the GPU side. All of the communication between the CPU and GPU sides which is relevant for the various embodiments may be done via the memory 43. To collect a trace, the binary instrumentation engine allocates a buffer (e.g., the trace buffer 46) and initializes the trace buffer 46 (e.g., as described in more detail below). The trace buffer 46 is located within the memory 43 and can be accessed from both the CPU and GPU sides. The instrumented kernel 47 is provided with a pointer to the trace buffer 46. During the execution on the GPU 42, the instrumented kernel 45 writes information into the trace buffer 46. When done, the binary instrumentation engine 44 retrieves the data collected within the trace buffer 46 and processes it. Then, the processed data may be provided to a user.

Figure 5:
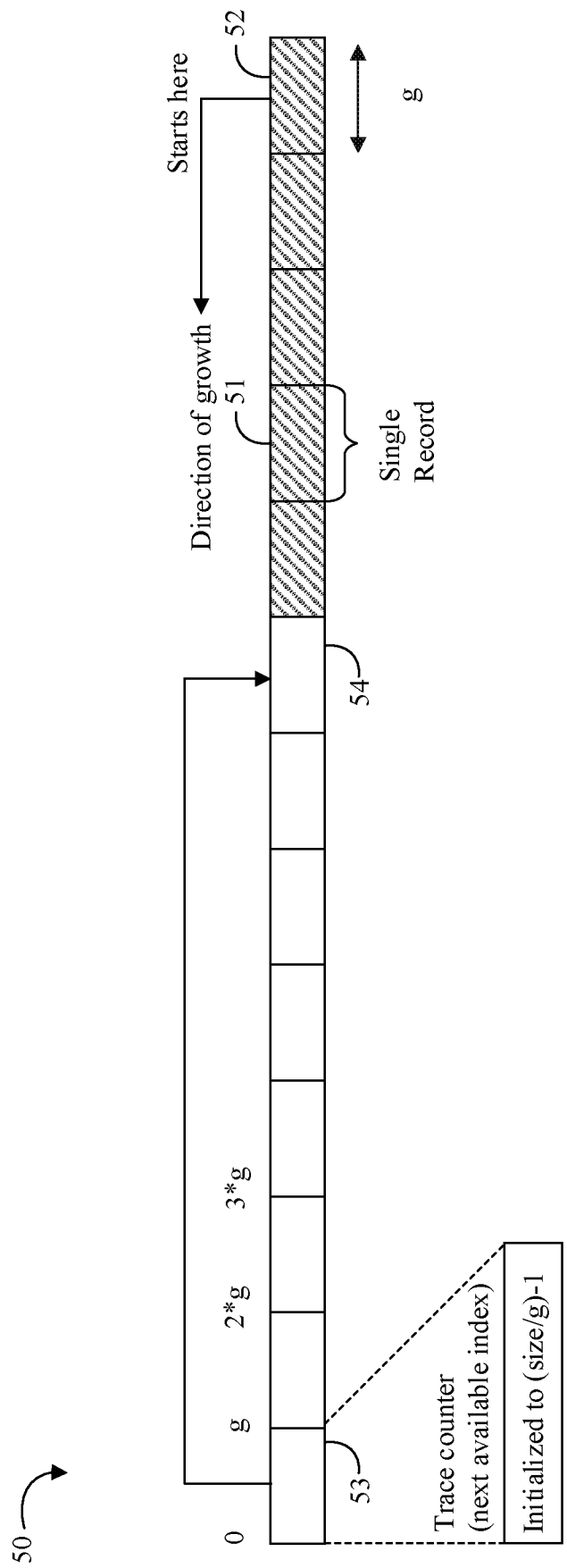
FIG. 5 is a block diagram of an example of a layout of a trace buffer according to an embodiment.

Turning now to FIG. 5, an embodiment of a layout of trace buffer 50 may include multiple records 51 of size g, where filled records are shown with a hatch pattern and available records are blank (solid white). The trace buffer 50 is an array of records of the same size (g). For each trace (e.g., control-flow trace, memory accesses trace, or any other trace), the record size might be different. However, for the trace of a specific type all the records are of the same size (e.g., in order to simplify management of the trace buffer 50).

The trace starts at the highest index 52 of the array of records and grows downwards. The first element of the trace buffer (offset 0 from its base address) is assigned to hold a trace counter 53. At any point of time the trace counter 53 points to the next available slot 54 within the trace buffer 50 where the next record can be saved. The trace counter 53 is always in granularity of the record size. The trace counter 53 is initialized (e.g., by the binary instrumentation engine before the execution) to the value which equals ([(buffer total size)/(single record size)]−1) to point to the last slot 53 of the array of records. The trace buffer 50 is allocated in such a way to hold the whole number of records.

The trace counter 53 can be accessed by the instrumented kernel via atomic subtraction (SUB) operations only, to prevent a conflict between several instances of the same kernel running concurrently on different hardware threads of the GPU device and saving the data within the same trace buffer. The atomic SUB operation may have a pseudo code as follows:

```
Next_available_slot = ATOMIC_SUB(N), Where
ATOMIC_SUB(buffer, N)
{
   LOCK-ACCESS-FROM_OTHER-THREADS-TO(buffer[0])
   TMP = buffer[0]
   buffer[0] = buffer[0] − N
   UNLOCK-ACCESS-FROM_OTHER-THREADS-TO(buffer[0])
   RETURN TMP
}
``` where N is a number of records to be reserved (allocated) from the trace buffer 50 for a current instance of the kernel. At any point of execution each kernel can save several trace records in a row (block of records). For example, the kernel first reserves the space by providing the desired number of records (minimum 1). Each record (or each block of records) should include enough meta-data information for the binary instrumentation engine to be able to parse the trace buffer 50.

For example, the meta-data might include a HW thread ID (TID) of where the current kernel instance is being executed, a basic-block (BBL) ID from which the record is saved, the size of the block-of-records, etc. The amount of information (both meta-data and data itself should be low or minimal collection of the possible dynamic data which can be obtained from the GPU only (e.g., and is not available on CPU). After the kernel performs the atomic-SUB instruction, the kernel obtains the index of the next available slot within the trace buffer 50, and it is ensured the required number of records is reserved.

Figure 6:
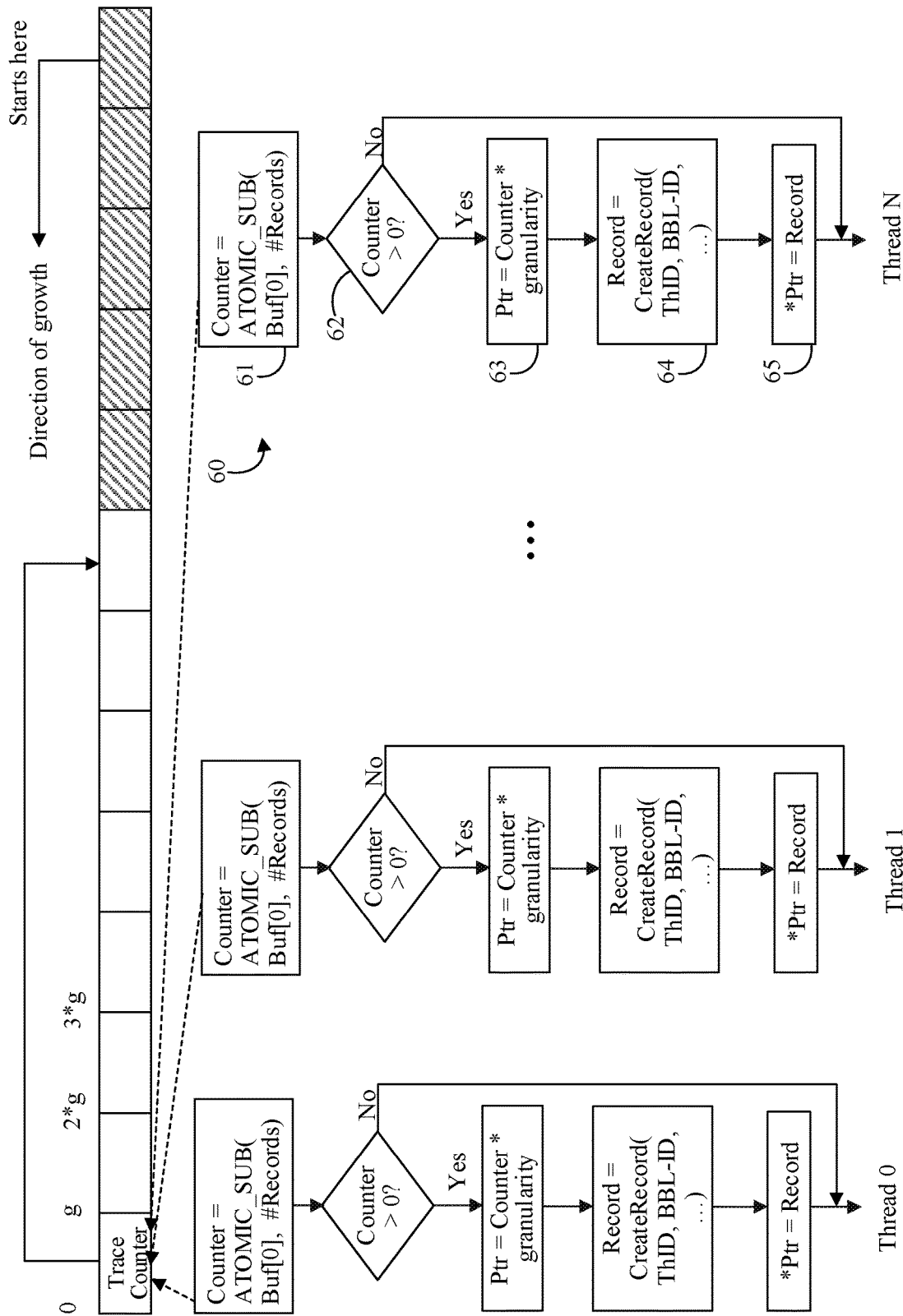
FIG. 6 is an illustrative diagram of an example of method of dynamic tracing according to an embodiment.

Turning now to FIG. 6, an embodiment of a method 60 of dynamic tracing is shown for multiple threads (e.g., Thread 0 through Thread N). In some GPU architectures, hundreds of instances of the same kernel are executed concurrently on multiple available HW threads. All of those instances will trace the data into the same trace buffer. In some embodiments, each time an instance of the kernel wants to save some data into the trace buffer, the kernel performs the method 60 which includes obtaining the next available slot within the trace buffer by accessing atomically to the trace counter and reserving slots for N (>=1) records at block 61 (e.g., calling ATOMIC_SUB as described above). Advantageously, conflict between different HW threads is avoided. The method 60 may then include determining if the returned counter value (for the next available slot) is greater than zero (0) at block 62. If not, the method 60 may include continuing execution without saving data to the trace buffer. If the provided slot is greater than 0 at block 62 (e.g., meaning the trace buffer is not overflowed), the method 60 may proceed to computing the pointer to the current slot by multiplying the obtained slot by the size of the single record at block 63, preparing a record (might include data, meta-data or both) and, if the pointer is still within the buffer, saving the record into the trace buffer at block 64, and propagate the pointer to the next record at block 65 (e.g., iterating blocks 64 and 65 for all required records to be saved in a row). After all the records are saved (or the pointer is not within the buffer), the method 60 may proceed to continuing execution.

Figure 7:
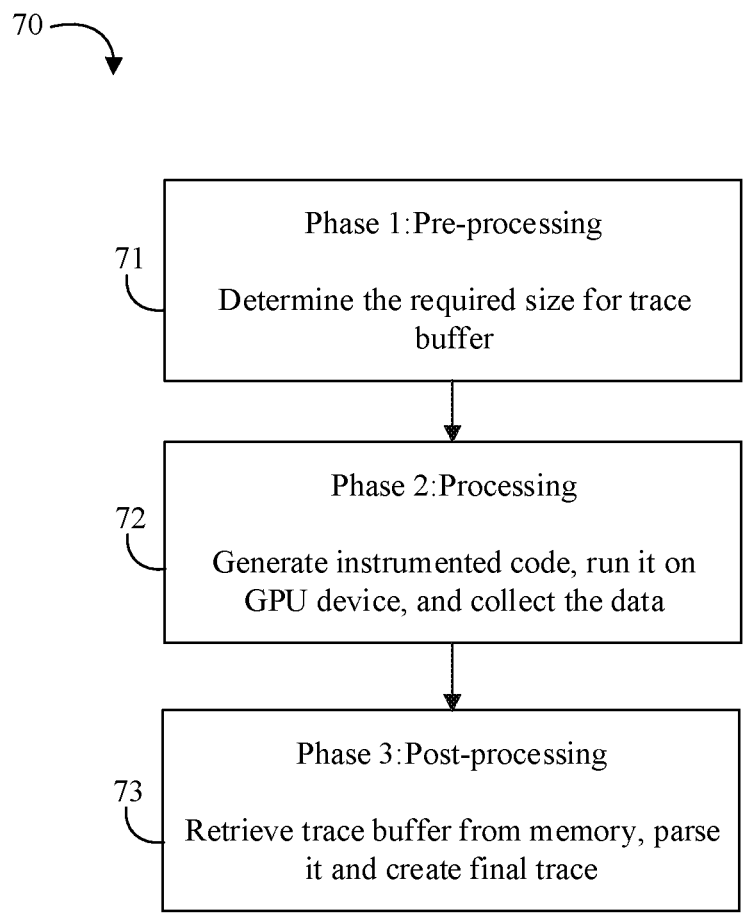
FIG. 7 is a flowchart of another example of a method of tracing code according to an embodiment.

Turning now to FIG. 7, an embodiment of a method 70 of tracing code may include pre-processing at block 71 (e.g., including determining the required size for the trace buffer), processing at block 72 (e.g., including generating the instrumented code, running the instrumented code on the GPU device, and collecting the data), and post-processing at block 73 (e.g., including retrieving the trace buffer from memory, parsing the trace buffer, and creating the final trace), which may also be referred to as Phase 1: pre-processing, Phase 2: processing, and Phase 3: post-processing.

For Phase 1: pre-processing, the CPU side may analyze the kernel and determine an amount of required records. In some embodiments, the goal of Phase 1 is to estimate the size of the buffer required to collect a specific trace for a given workload. The estimate may be determined by analyzing the original kernel code (e.g., what kind of memory instructions exist in each basic block, etc.), determining the amount of records to be saved for each basic block, and counting the dynamic frequencies of each basic block to be instrumented (e.g., by running the same kernel separately to count basic block frequencies, or based on prior experience with running the kernel). The amount of records may also be set to or limited to some pre-determined number (e.g., no more than 1000 records).

For Phase 2: processing, trace collection can proceed after the size of the required trace buffer is determined. For trace collection, the following steps may be performed: 1) Instrument the original kernel code correspondingly; 2) Save all required static information for post-processing phase (e.g., all memory instructions static data per basic block); 3) Allocate the trace buffer to include the required amount of records and initialize the trace counter as described above; and 4) Run the instrumented kernel and collect dynamic data.

For Phase 3: post-processing, the CPU side may parse the collected data and finalize the trace creation. After the dynamic data is collected the following steps may be performed: 1) Parse the dynamically collected data; 2) Separate the data per HW thread ID; and 3) Combine the dynamic data with the static data and finalize the trace creation.

Figure 8:
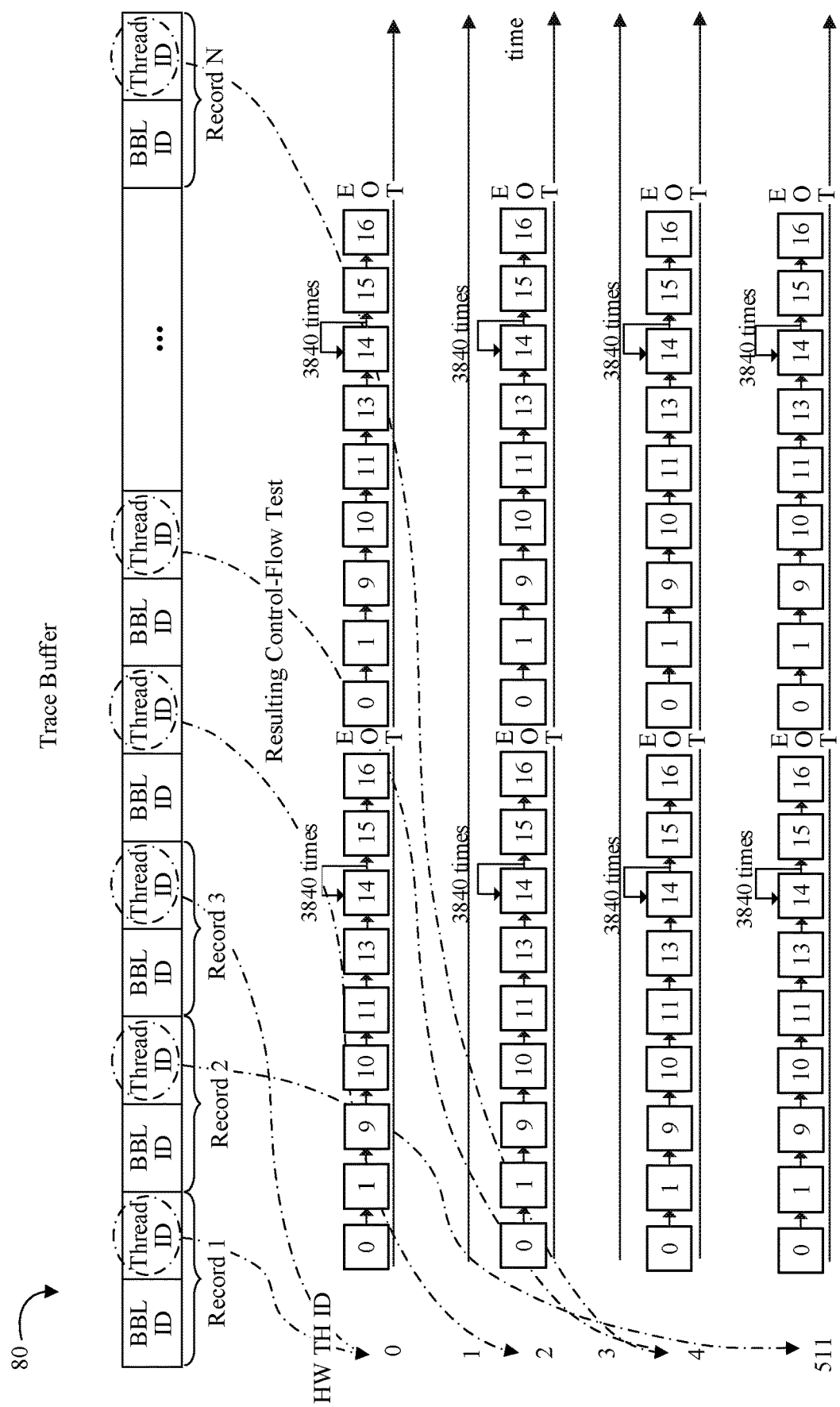
FIG. 8 is a block diagram of an example of a control-flow trace according to an embodiment.

Turning to FIG. 8, an embodiment of a control-flow trace 80 shows the final trace after the post-processing phase. The trace buffer may be parsed to separate the data based on TID to create the final traces. The numbers inside the boxes for each TID trace may correspond to BBL IDs.

Trace Buffer Example Layout for an Instruction (Control-Flow) Trace

Figure 9:
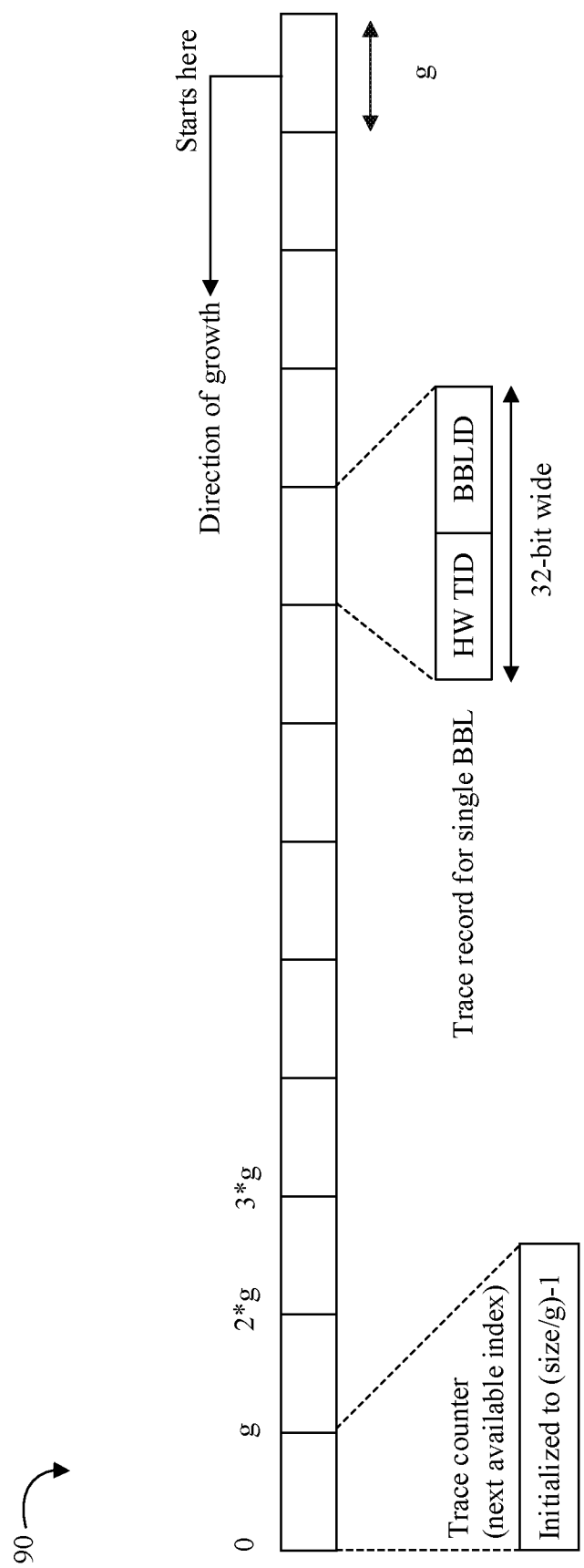
FIG. 9 is a block diagram of another example of a layout of a trace buffer according to an embodiment.

Turning now to FIG. 9, an embodiment of a layout of a trace buffer 90 shows an example of an instruction (or control-flow) trace. The minimal required data to be saved on the GPU side is BBL ID and HW thread ID (TID). A record size of 4 bytes (32 bits) may be large enough to store the required data.

Trace Buffer Layout Example for a Memory Access (Addresses) Trace

Figure 10:
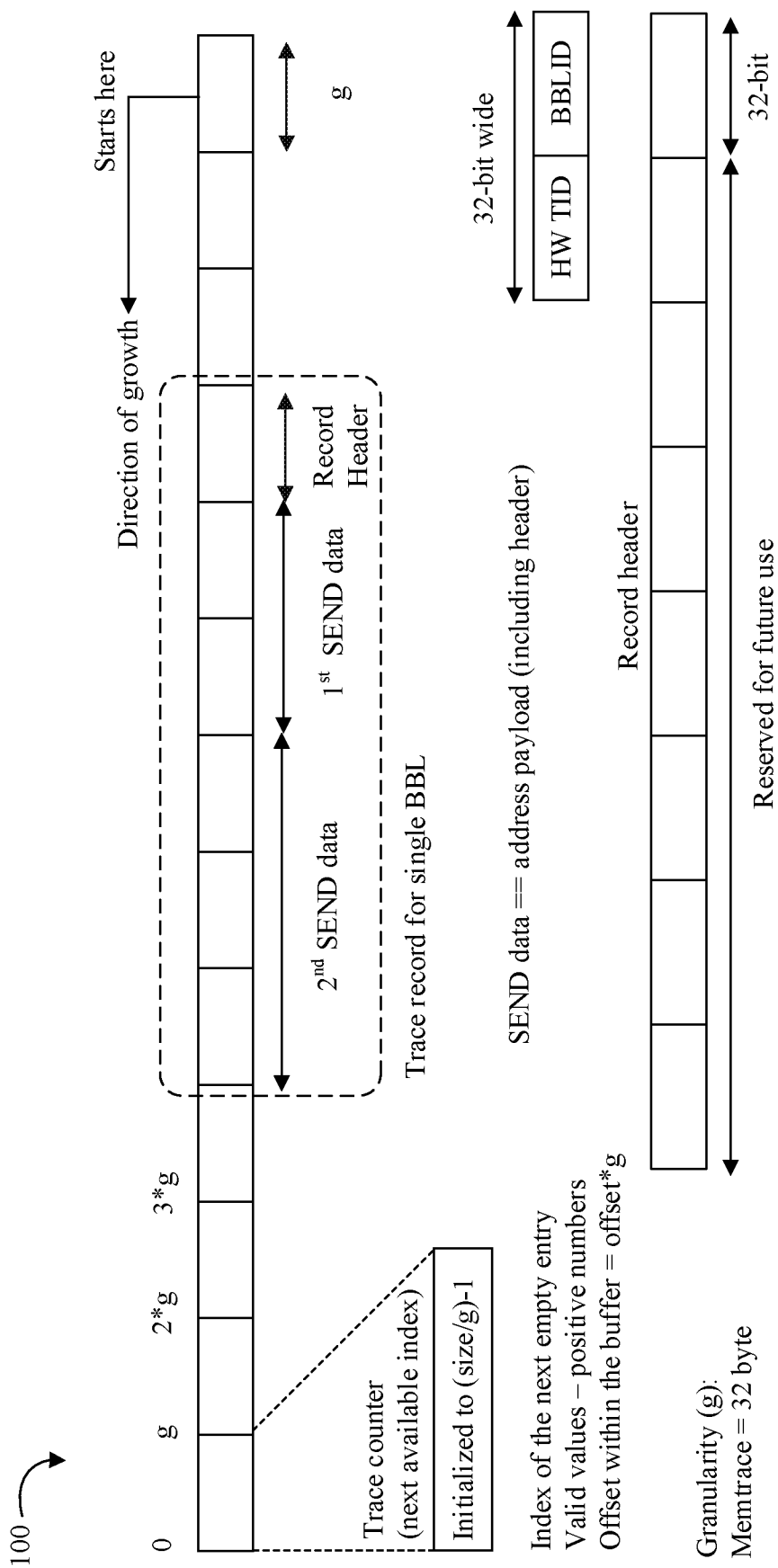
FIG. 10 is a block diagram of another example of a layout of a trace buffer according to an embodiment.

Turning now to FIG. 10, an embodiment of a layout of a trace buffer 100 shows an example of a memory accesses (or memory addresses) trace. To simplify instrumentation, tracing, and post-processing processes, saving all of the data for all memory access instructions within single basic-block in a row may be preferred. For each memory access instruction, the addressing payload (up to 4 256-bit registers) must be saved. The number of required registers to be saved is known at the instrumentation time. In addition, the meta-data indicating BBL ID and HW thread ID should be saved. The trace buffer may define a single record of 32 bytes in size (single register). The number of required records per basic block is equal to the total number of registers holding the address payload of all memory access instructions within the basic block, with an addition of another record which will carry the meta-data information (e.g., which may be referred to as a "header" record), as illustrated in FIG. 10.

Figure 11A:
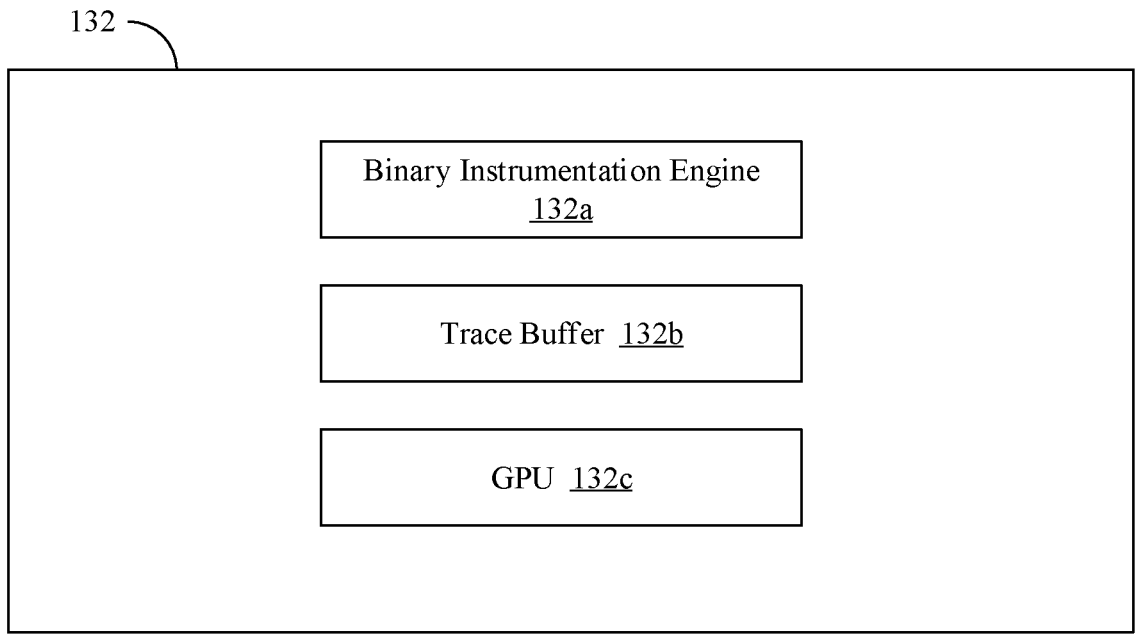
FIGS. 11A and 11B are block diagrams of examples of binary instrumentation apparatuses according to embodiments.

FIG. 11A shows a binary instrumentation apparatus 132 (132a-132c) that may implement one or more aspects of the method 25, the method 60, and/or the method 70. The binary instrumentation apparatus 132, which may include logic instructions, configurable logic, fixed-functionality hardware logic, may be readily substituted for the system 10 and/or the system 40, already discussed. A binary instrumentation engine 132a may determine a size for a trace buffer 132b based on instrumented code to be executed on a GPU 132c, initialize the trace buffer 132b based on the determined size, provide the instrumented code to the GPU 132c to be executed, collect data in the trace buffer 132b from the executed instrumented code, analyze the data collected in the trace buffer 132b, and generate a trace of the instrumented code based on the analyzed data. In some embodiments, the engine 132a may be configured to provide the instrumented code with a pointer to the trace buffer 132b. For example, the engine 132a may also be configured to instrument the code to atomically access the trace buffer 132b to reserve a portion of the trace buffer 132b for data from a thread of the executed instrumented code. In some embodiments, the engine 132a may be further configured to determine static trace information prior to execution of the instrumented code. For example, the engine 132a may also be configured to parse the dynamically collected data, separate dynamic trace information based on thread information from the parsed data, and combine the dynamic trace information with the static trace information to generate the trace of the instrumented code.

Figure 11B:
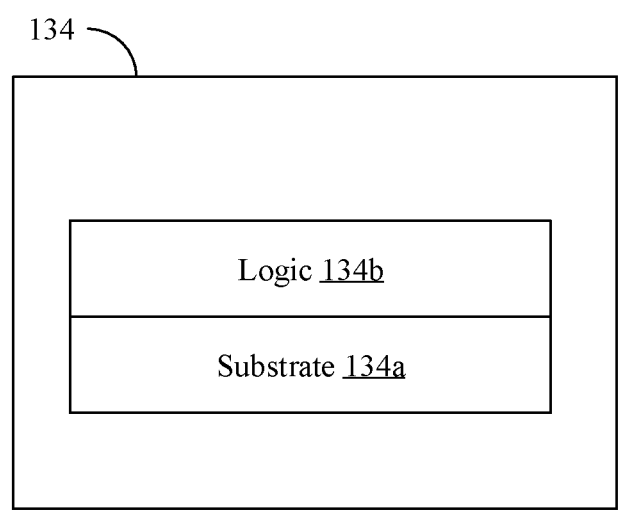

Turning now to FIG. 11B, binary instrumentation apparatus 134 (134a, 134b) is shown in which logic 134b (e.g., transistor array and other integrated circuit/IC components) is coupled to a substrate 134a (e.g., silicon, sapphire, gallium arsenide). The logic 134b may generally implement one or more aspects of the method 25, the method 60, and/or the method 70. Thus, the logic 134b may determine a size for a trace buffer based on instrumented code to be executed on a graphics processor, initialize the trace buffer in a shared memory based on the determined size, provide the instrumented code to the graphics processor to be executed, collect data in the trace buffer from the executed instrumented code, analyze the data collected in the trace buffer on a processor, and generate a trace of the instrumented code on the processor based on the analyzed data. In some embodiments, the logic 134b may be configured to provide the instrumented code with a pointer to the trace buffer. For example, the logic 134b may also be configured to atomically access the trace buffer to reserve a portion of the trace buffer for data from a thread of the executed instrumented code. In some embodiments, the logic 134b may be further configured to determine static trace information prior to execution of the instrumented code. For example, the logic 134b may also be configured to parse the dynamically collected data on the processor, separate dynamic trace information on the processor based on thread information from the parsed data, and combine the dynamic trace information with the static trace information to generate the trace of the instrumented code on the processor. In one example, the apparatus 134 is a semiconductor die, chip and/or package.

Figure 12:
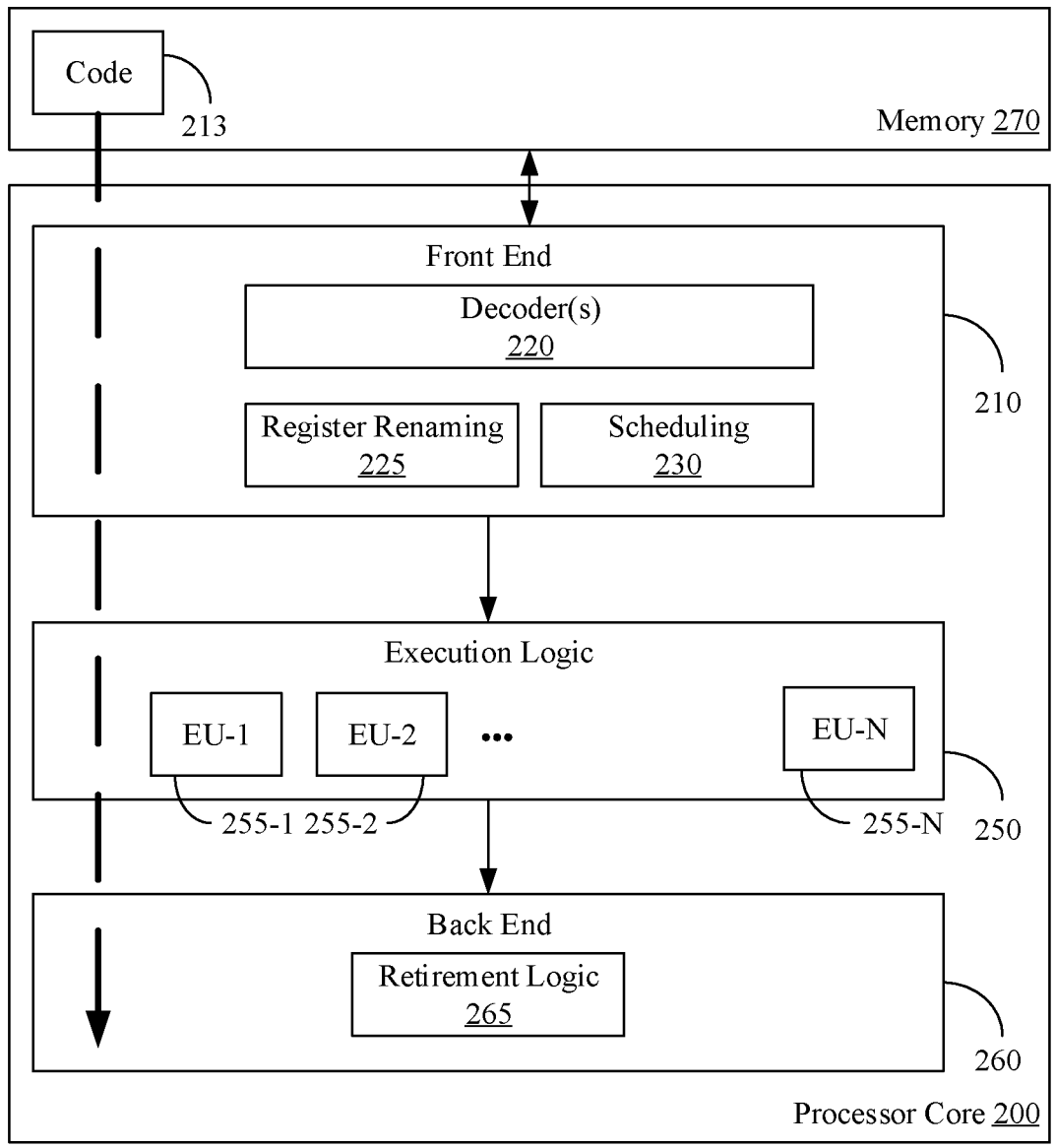
FIG. 12 is a block diagram of an example of a processor according to an embodiment.

FIG. 12 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 12, a processing element may alternatively include more than one of the processor core 200 illustrated in FIG. 12. The processor core 200 may be a single-threaded core or, for at least one embodiment, the processor core 200 may be multithreaded in that it may include more than one hardware thread context (or "logical processor") per core.

FIG. 12 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement one or more aspects of the method 25, the method 60, and/or the method 70, already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 12, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 13:
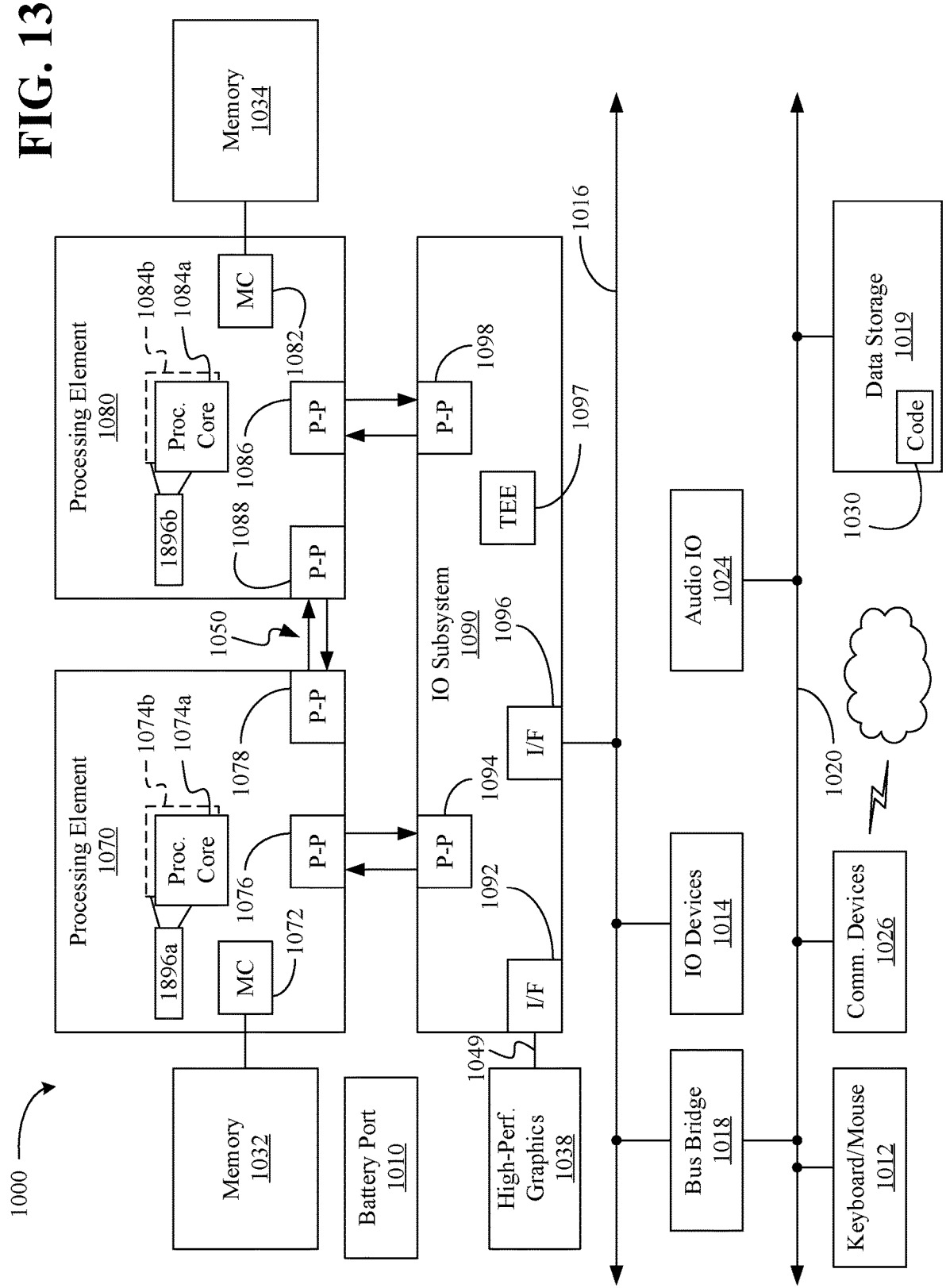
FIG. 13 is a block diagram of an example of a system according to an embodiment.

Referring now to FIG. 13, shown is a block diagram of a system 1000 embodiment in accordance with an embodiment. Shown in FIG. 13 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 13 may be implemented as a multi-drop bus rather than point-to-point interconnect.

As shown in FIG. 13, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 12.

Each processing element 1070, 1080 may include at least one shared cache 1896a, 1896b (e.g., static random access memory/SRAM). The shared cache 1896a, 1896b may store data (e.g., objects, instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 13, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 13, the I/O subsystem 1090 includes a TEE 1097 (e.g., security controller) and P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 13, various I/O devices 1014 (e.g., cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, network controllers/communication device(s) 1026 (which may in turn be in communication with a computer network), and a data storage unit 1019 such as a disk drive or other mass storage device which may include code 1030, in one embodiment. The code 1030 may include instructions for performing embodiments of one or more of the methods described above. Thus, the illustrated code 1030 may implement one or more aspects of the method 25, the method 60, and/or the method 70, already discussed, and may be similar to the code 213 (FIG. 12), already discussed. Further, an audio I/O 1024 may be coupled to second bus 1020 and a battery port 1010 may provide power to the system 1000.

Note that other embodiments are contemplated. For example, instead of the point-to-point architecture of FIG. 13, a system may implement a multi-drop bus or another such communication topology.

ADDITIONAL NOTES AND EXAMPLES

Example 1 includes an electronic processing system, comprising a processor, a graphics processor, memory communicatively coupled to the processor and the graphics processor, and logic communicatively coupled to the processor and the graphics processor to determine a size for a trace buffer based on instrumented code to be executed on the graphics processor, initialize the trace buffer in the memory based on the determined size, provide the instrumented code to the graphics processor to be executed, collect data in the trace buffer from the executed instrumented code, analyze the data collected in the trace buffer on the processor, and generate a trace of the instrumented code on the processor based on the analyzed data.

Example 2 includes the system of Example 1, wherein the logic is further to provide the instrumented code with a pointer to the trace buffer.

Example 3 includes the system of Example any of Examples 1 to 2, wherein the logic is further to atomically access the trace buffer to reserve a portion of the trace buffer for data from a thread of the executed instrumented code.

Example 4 includes the system of any of Examples 1 to 3, wherein the logic is further to determine static trace information prior to execution of the instrumented code.

Example 5 includes the system of Example 4, wherein the logic is further to parse the dynamically collected data on the processor, separate dynamic trace information on the processor based on thread information from the parsed data, and combine the dynamic trace information with the static trace information to generate the trace of the instrumented code on the processor.

Example 6 includes the system of any of Examples 1 to 5, wherein the graphics processor comprises two or more parallel execution units.

Example 7 includes a semiconductor package apparatus for use with a graphics processor, comprising one or more substrates, and logic coupled to the one or more substrates, wherein the logic is at least partly implemented in one or more of configurable logic and fixed-functionality hardware logic, the logic coupled to the one or more substrates to determine a size for a trace buffer based on instrumented code to be executed on a graphics processor, initialize the trace buffer in a shared memory based on the determined size, provide the instrumented code to the graphics processor to be executed, collect data in the trace buffer from the executed instrumented code, analyze the data collected in the trace buffer on a processor, and generate a trace of the instrumented code on the processor based on the analyzed data.

Example 8 includes the apparatus of Example 7, wherein the logic is further to provide the instrumented code with a pointer to the trace buffer.

Example 9 includes the apparatus of any of Examples 7 to 8, wherein the logic is further to atomically access the trace buffer to reserve a portion of the trace buffer for data from a thread of the executed instrumented code.

Example 10 includes the apparatus of any of Examples 7 to 9, wherein the logic is further to determine static trace information prior to execution of the instrumented code.

Example 11 includes the apparatus of Example 10, wherein the logic is further to parse the dynamically collected data on the processor, separate dynamic trace information on the processor based on thread information from the parsed data, and combine the dynamic trace information with the static trace information to generate the trace of the instrumented code on the processor.

Example 12 includes the apparatus of any of Examples 7 to 11, wherein the graphics processor comprises two or more parallel execution units.

Example 13 includes the apparatus of any of Examples 7 to 12, wherein the logic coupled to the one or more substrates includes transistor channel regions that are positioned within the one or more substrates.

Example 14 includes a method of tracing code, comprising determining a size for a trace buffer based on instrumented code to be executed on a graphics processor, initializing the trace buffer in a shared memory based on the determined size, providing the instrumented code to the graphics processor to be executed, collecting data in the trace buffer from the executed instrumented code, analyzing the data collected in the trace buffer on a processor, and generating a trace of the instrumented code on the processor based on the analyzed data.

Example 15 includes the method of Example 14, further comprising providing the instrumented code with a pointer to the trace buffer.

Example 16 includes the method of any of Examples 14 to 15, further comprising atomically accessing the trace buffer to reserve a portion of the trace buffer for data from a thread of the executed instrumented code.

Example 17 includes the method of any of Examples 14 to 16, further comprising determining static trace information prior to execution of the instrumented code.

Example 18 includes the method of Example 17, further comprising parsing the dynamically collected data on the processor, separating dynamic trace information on the processor based on thread information from the parsed data, and combining the dynamic trace information with the static trace information to generate the trace of the instrumented code on the processor.

Example 19 includes the method of any of Examples 14 to 18, wherein the graphics processor comprises two or more parallel execution units.

Example 20 includes at least one computer readable storage medium, comprising a set of instructions, which when executed by a computing device, cause the computing device to determine a size for a trace buffer based on instrumented code to be executed on a graphics processor, initialize the trace buffer in a shared memory based on the determined size, provide the instrumented code to the graphics processor to be executed, collect data in the trace buffer from the executed instrumented code, analyze the data collected in the trace buffer on a processor, and generate a trace of the instrumented code on the processor based on the analyzed data.

Example 21 includes the at least one computer readable storage medium of Example 20, comprising a further set of instructions, which when executed by the computing device, cause the computing device to provide the instrumented code with a pointer to the trace buffer.

Example 22 includes the at least one computer readable storage medium of any of Examples 20 to 21, comprising a further set of instructions, which when executed by the computing device, cause the computing device to atomically access the trace buffer to reserve a portion of the trace buffer for data from a thread of the executed instrumented code.

Example 23 includes the at least one computer readable storage medium of any of Examples 20 to 22, comprising a further set of instructions, which when executed by the computing device, cause the computing device to determine static trace information prior to execution of the instrumented code.

Example 24 includes the at least one computer readable storage medium of Example 23, comprising a further set of instructions, which when executed by the computing device, cause the computing device to parse the dynamically collected data on the processor, separate dynamic trace information on the processor based on thread information from the parsed data, and combine the dynamic trace information with the static trace information to generate the trace of the instrumented code on the processor.

Example 25 includes the at least one computer readable medium storage medium of any of Examples 20 to 24, wherein the graphics processor comprises two or more parallel execution units.

Example 26 includes a code trace apparatus, comprising means for determining a size for a trace buffer based on instrumented code to be executed on a graphics processor, means for initializing the trace buffer in a shared memory based on the determined size, means for providing the instrumented code to the graphics processor to be executed, means for collecting data in the trace buffer from the executed instrumented code, means for analyzing the data collected in the trace buffer on a processor, and means for generating a trace of the instrumented code on the processor based on the analyzed data.

Example 27 includes the apparatus of Example 26, further comprising means for providing the instrumented code with a pointer to the trace buffer.

Example 28 includes the apparatus of any of Examples 26 to 27, further comprising means for atomically accessing the trace buffer to reserve a portion of the trace buffer for data from a thread of the executed instrumented code.

Example 29 includes the apparatus of any of Examples 26 to 28, further comprising means for determining static trace information prior to execution of the instrumented code.

Example 30 includes the apparatus of Example 29, further comprising means for parsing the dynamically collected data on the processor, means for separating dynamic trace information on the processor based on thread information from the parsed data, and means for combining the dynamic trace information with the static trace information to generate the trace of the instrumented code on the processor.

Example 31 includes the apparatus of any of Examples 26 to 30, wherein the graphics processor comprises two or more parallel execution units.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

I claim:

1. An electronic processing system, comprising:
   a host processor;
   a graphics processor;
   memory communicatively coupled to the host processor and the graphics processor; and
   logic communicatively coupled to the host processor and the graphics processor to:
     analyze, with the host processor, code that is to be instrumented to determine a size for a trace buffer based on types of memory instructions within each block of a plurality of blocks of the code,
     instrument, with the host processor, the code to generate instrumented code to be executed on the graphics processor,
     initialize, with the host processor, the trace buffer in the memory based on the determined size,
     provide the instrumented code to the graphics processor to be executed,
     collect data in the trace buffer from the executed instrumented code,
     bypass a storage of data from the executed instrumented code in the trace buffer in response to the trace buffer reaching a threshold amount,
     analyze the data collected in the trace buffer on the host processor, and
     generate a trace of the instrumented code on the host processor.

2. The system of claim 1, wherein the logic is further to:
   provide the instrumented code with a pointer to the trace buffer.

3. The system of claim 2, wherein the logic is further to:
   atomically access the trace buffer to reserve a portion of the trace buffer for data from a thread of the executed instrumented code.

4. The system of claim 1, wherein the logic is further to:
   determine static trace information prior to execution of the instrumented code.

5. The system of claim 4, wherein the logic is further to:
   parse the dynamically collected data on the processor;
   separate dynamic trace information on the processor based on thread information from the parsed data; and combine the dynamic trace information with the static trace information to generate the trace of the instrumented code on the processor.

6. The system of claim 1, wherein the graphics processor comprises two or more parallel execution units.

7. A semiconductor package apparatus for use with a graphics processor, comprising:
one or more substrates; and
logic coupled to the one or more substrates, wherein the logic is at least partly implemented in one or more of configurable logic or fixed-functionality logic hardware, the logic coupled to the one or more substrates to:
analyze, with a host processor, code that is to be instrumented to determine a size for a trace buffer based on types of memory instructions within each block of a plurality of blocks of the code,
instrument, with the host processor, the code to generate instrumented code to be executed on a graphics processor,
initialize, with the host processor, the trace buffer in a shared memory based on the determined size,
provide the instrumented code to the graphics processor to be executed,
collect data in the trace buffer from the executed instrumented code,
bypass a storage of data from the executed instrumented code in the trace buffer in response to the trace buffer reaching a threshold amount,
analyze the data collected in the trace buffer on the host processor, and
generate a trace of the instrumented code on the host processor based on the analyzed data.

8. The apparatus of claim 7, wherein the logic is further to:
provide the instrumented code with a pointer to the trace buffer.

9. The apparatus of claim 8, wherein the logic is further to:
atomically access the trace buffer to reserve a portion of the trace buffer for data from a thread of the executed instrumented code.

10. The apparatus of claim 7, wherein the logic is further to:
determine static trace information prior to execution of the instrumented code.

11. The apparatus of claim 10, wherein the logic is further to:
parse the dynamically collected data on the processor;
separate dynamic trace information on the processor based on thread information from the parsed data; and
combine the dynamic trace information with the static trace information to generate the trace of the instrumented code on the processor.

12. The apparatus of claim 7, wherein the graphics processor comprises two or more parallel execution units.

13. The apparatus of claim 7, wherein the logic coupled to the one or more substrates includes transistor channel regions that are positioned within the one or more substrates.

14. A method of tracing code, comprising:
analyzing code, with a host processor, that is to be instrumented to determine a size for a trace buffer based on types of memory instructions within each block of a plurality of blocks of the code;
instrumenting, with the host processor, the code to generate instrumented code to be executed on a graphics processor;
initializing, with the host processor, the trace buffer in a shared memory based on the determined size;
providing the instrumented code to the graphics processor to be executed;
collecting data in the trace buffer from the executed instrumented code;
bypassing a storage of data from the executed instrumented code in the trace buffer in response to the trace buffer reaching a threshold amount;
analyzing the data collected in the trace buffer on the host processor; and
generating a trace of the instrumented code on the host processor based on the analyzed data.

15. The method of claim 14, further comprising:
providing the instrumented code with a pointer to the trace buffer.

16. The method of claim 15, further comprising:
atomically accessing the trace buffer to reserve a portion of the trace buffer for data from a thread of the executed instrumented code.

17. The method of claim 14, further comprising:
determining static trace information prior to execution of the instrumented code.

18. The method of claim 17, further comprising:
parsing the dynamically collected data on the processor;
separating dynamic trace information on the processor based on thread information from the parsed data; and
combining the dynamic trace information with the static trace information to generate the trace of the instrumented code on the processor.

19. The method of claim 14, wherein the graphics processor comprises two or more parallel execution units.

20. At least one non-transitory computer readable storage medium, comprising a set of instructions, which when executed by a computing device, cause the computing device to:
analyze, with a host processor, code that is to be instrumented to determine a size for a trace buffer based on types of memory instructions within each block of a plurality of blocks of the code;
instrument, with the host processor, the code to generate instrumented code to be executed on a graphics processor;
initialize, with the host processor, the trace buffer in a shared memory based on the determined size;
provide the instrumented code to the graphics processor to be executed;
collect data in the trace buffer from the executed instrumented code;
bypass a storage of data from the executed instrumented code in the trace buffer in response to the trace buffer reaching a threshold amount
analyze the data collected in the trace buffer on the host processor; and
generate a trace of the instrumented code on the host processor based on the analyzed data.

21. The at least one non-transitory computer readable storage medium of claim 20, comprising a further set of instructions, which when executed by the computing device, cause the computing device to:
provide the instrumented code with a pointer to the trace buffer.

22. The at least one non-transitory computer readable storage medium of claim 21, comprising a further set of instructions, which when executed by the computing device, cause the computing device to:

atomically access the trace buffer to reserve a portion of the trace buffer for data from a thread of the executed instrumented code.

23. The at least one non-transitory computer readable storage medium of claim 20, comprising a further set of instructions, which when executed by the computing device, cause the computing device to:
   determine static trace information prior to execution of the instrumented code.

24. The at least one non-transitory computer readable storage medium of claim 23, comprising a further set of instructions, which when executed by the computing device, cause the computing device to:
   parse the dynamically collected data on the processor;
   separate dynamic trace information on the processor based on thread information from the parsed data; and
   combine the dynamic trace information with the static trace information to generate the trace of the instrumented code on the processor.

25. The at least one non-transitory computer readable medium storage medium of claim 20, wherein the graphics processor comprises two or more parallel execution units.

* * * * *